(12) United States Patent
Mulgrew et al.

(10) Patent No.: US 7,232,878 B2
(45) Date of Patent: Jun. 19, 2007

(54) POLYMER TREATMENT FOR SEPARATING VOLATILE MATERIAL

(75) Inventors: Gerald Mulgrew, Glasgow (GB); Gary Lindsay Pitman, Stirling (GB)

(73) Assignee: BP Chemicals Limited, London (GB)

( * ) Notice: Subject to any disclaimer, the term of this patent is extended or adjusted under 35 U.S.C. 154(b) by 596 days.

(21) Appl. No.: 10/475,344

(22) PCT Filed: Apr. 18, 2002

(86) PCT No.: PCT/GB02/01794

§ 371 (c)(1),
(2), (4) Date: Oct. 20, 2003

(87) PCT Pub. No.: WO02/088194

PCT Pub. Date: Nov. 7, 2002

(65) Prior Publication Data

US 2004/0132964 A1  Jul. 8, 2004

(30) Foreign Application Priority Data

Apr. 25, 2001 (GB) .................................. 0110161.7

(51) Int. Cl.
*C08F 6/00* (2006.01)
(52) U.S. Cl. .................. 528/480; 34/287; 95/266; 95/267; 159/3; 159/292; 203/10; 203/11; 203/19; 528/481; 528/483
(58) Field of Classification Search .................. 34/287; 95/266, 267; 159/3, 29; 203/10, 11, 19; 528/480, 481, 483
See application file for complete search history.

(56) References Cited

U.S. PATENT DOCUMENTS 3,799,234 A * 3/1974 Skidmore .................. 159/2.2
4,372,758 A * 2/1983 Bobst et al. ................. 528/483
5,476,622 A * 12/1995 Moorhead et al. .......... 264/639
5,955,569 A * 9/1999 Dujari et al. ............... 528/480

FOREIGN PATENT DOCUMENTS

| EP | 0 047 077 A1 | 3/1982 |
|----|--------------|--------|
| GB | 1 272 778 | 5/1972 |
| JP | 05239159 | * 9/1993 |

OTHER PUBLICATIONS

"Multi-Tray Fluidized Bed Column for Resin Degassing", Research Disclosure, Kenneth Mason Publications, Hampshire, GB, No. 431, p. 432, (Mar. 2000).

* cited by examiner

*Primary Examiner*—Terressa Boykin
(74) *Attorney, Agent, or Firm*—Finnegan, Henderson, Farabow, Garrett & Dunner, L.L.P.

(57) ABSTRACT

A process for the separation of volatile material from particulate polymer which has been substantially freed from unreacted monomer in an earlier separation step, comprising (a) feeding the particulate polymer to a purge vessel, optionally causing it to move through the vessel in substantially plug-flow mode, (b) heating the particulate polymer in the purge vessel to a temperature greater than 30° C. but insufficiently high to cause the particles to become agglomerated, and/or maintaining the polymer at a temperature in this range in the purge vessel, (c) feeding air to the purge vessel counter-current to the movement of the particulate polymer to remove volatile material therefrom, (d) removing the particulate polymer from the purge vessel. Preferably the particulate polymer fed to the purge vessel is caused to move through the vessel in substantially plug-flow mode. The process is particularly suitable for polyethylene.

14 Claims, 1 Drawing Sheet

POLYMER TREATMENT FOR SEPARATING VOLATILE MATERIAL

Figure 1:
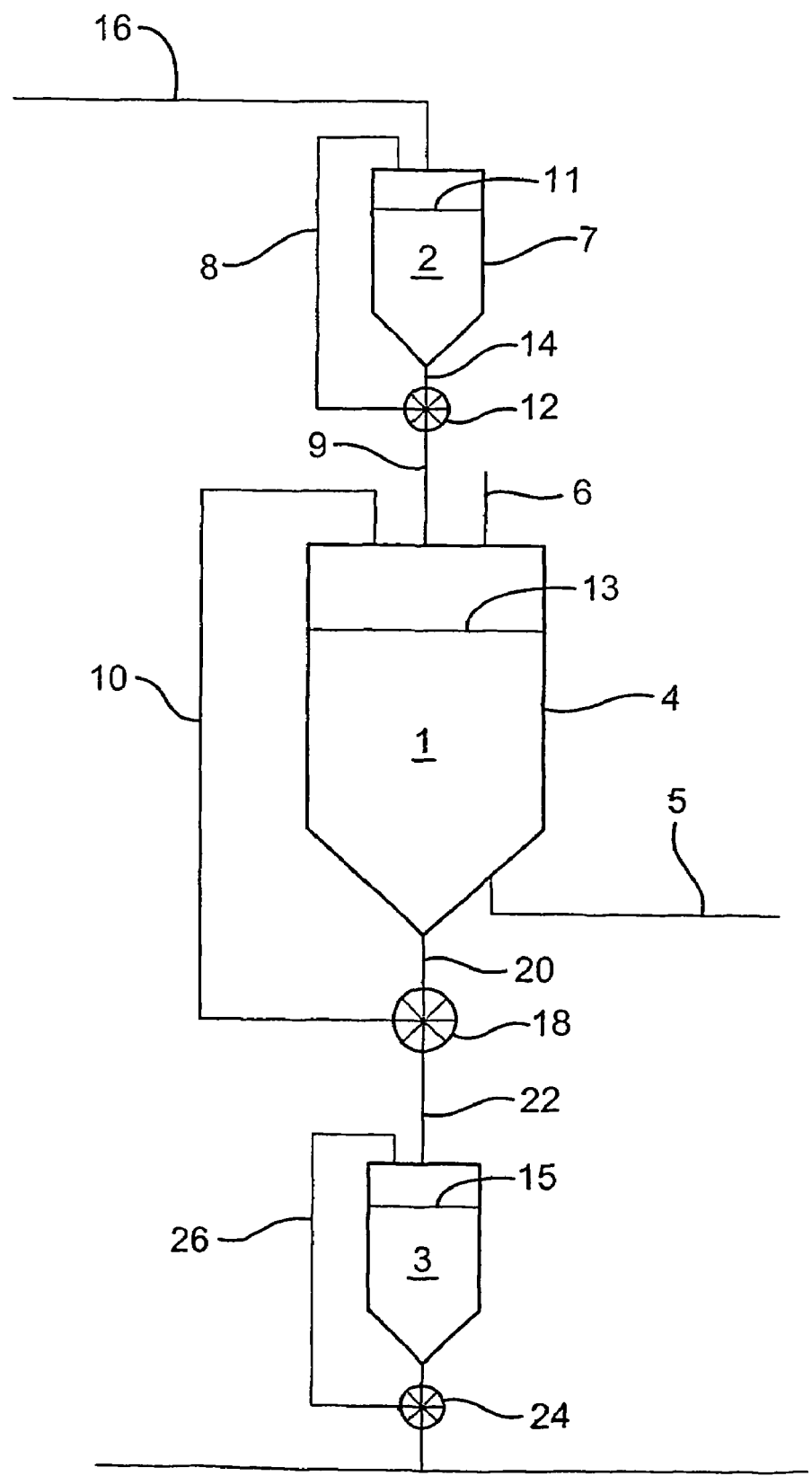

The present invention relates to a process for the removal of volatile material from particulate polymer, and more especially to the removal of traces of volatile constituents from pelletised polymer, polymer powder or granular polymeric material.

Whilst the present invention can in principle be applied to any particulate polymer for the removal of volatiles therefrom, the following description refers primarily to the application of the process to the removal of volatiles from particulate polyolefins.

Polyolefins prepared by catalytic polymerisation or copolymerisation of olefins, for example, ethylene, propylene or higher olefins such as $C_4$ to $C_{12}$ alpha-olefins, are generally subjected to a process for removal of the bulk of the unreacted monomer before being processed into useful articles. Such processes for removal of unreacted monomer generally involve a monomer separation and recovery procedure wherein the bulk of the unreacted monomer associated with the polyolefin product is separated therefrom when the polyolefin is first removed from the polymerisation reactor. Processes for this initial monomer separation and recovery depend on the particular technology being employed for the polymerisation reaction. For example, in the gas phase (co)polymerisation of olefins, the polyolefin product is normally a fine powder fluidised by, or stirred in, an atmosphere comprising the gaseous monomer(s). Monomer may be separated and recovered from the gas phase process, for example, by isolating a continuous stream of particulate polymer product associated with at least some gas, and optionally some liquid, comprising unreacted monomer; reducing the pressure and recycling the volatile components to the reactor; and purging the polymer component with inert gas, for example, nitrogen or carbon dioxide.

Thus the volatile materials referred to throughout this specification can be, for example, the monomer or monomers themselves, oligomers, any solvent or diluent used in the polymerisation, the catalyst materials or products derived therefrom, additives in the polymerisation (e.g. molecular weight regulators), impurities present in any of the materials used in the polymerisation, or materials employed for lubricating moving parts of the reactors. Such volatile substances can also arise from degradation or interreaction of the polymerisation components themselves and/or their products. The presence of such volatile substances in the final polymer is generally undesirable and can result, for example, in unwanted odour in articles manufactured therefrom, or can produce taint in foodstuffs packed in containers fabricated from the polymer, or in water from potable water piping systems. The presence of inflammable volatile materials can also present a fire or explosion hazard. Likewise, such volatile materials can have toxic, irritant or other undesirable pharmacological properties which normally render their removal desirable or even essential.

The production of volatile substances in the polymer can also occur during pelletisation of the polymer, for example, by thermal degradation of the polymer itself, or by the degradation of additives employed in the pelletising process.

GB-A-1272778 relates to a process for the removal of volatile constituents from particulate olefin polymers which have been produced by the gas phase polymerisation of the monomers for example of ethylene or propylene, by treating a layer of the polymer, whose particles have a mean diameter of from 10 to 5000 microns, with a stream of inert gas at a temperature of from at least +80° C., to at least 5° C. below the crystallite melting of the polymer in the treatment zone while keeping the layer in vigorous motion.

EP-A-0047077 relates to a process for removing unpolymerised gaseous monomers from solid olefin polymers by conveying the polymer (e.g. in granular form) to a purge vessel, contacting the polymer in the purge vessel with a countercurrent inert gas purge stream to strip away the monomer gases which are evolved from the polymer, and recycling a portion of the resulting inert gas-monomer gas stream to the purge vessel.

The present invention is concerned with an improved method for the removal of traces of volatile material, e.g. unreacted monomer, oligomers or other volatile constituents such as solvent or degradation products, from particulate polymeric materials, especially polymers prepared by the catalytic polymerisation of organic monomers. In particular, the present invention is concerned with removal of volatile materials from particulate polymeric materials, preferably particulate polyolefins, which have previously been subjected to at least one process for separation of the unreacted monomer, for example, by processes such as those described in GB-A-1272778 and EP-A-0047077.

The present invention provides a process for the separation of volatile material from particulate polymer which has been substantially freed from unreacted monomer in an earlier separation step, comprising (a) feeding the particulate polymer to a purge vessel, optionally causing it to move through the vessel in substantially plug-flow mode, (b) heating the particulate polymer in the purge vessel to a temperature greater than 30° C. but insufficiently high to cause the particles to become agglomerated, and/or maintaining the polymer at a temperature in this range in the purge vessel, (c) feeding air to the purge vessel counter-current to the movement of the particulate polymer to remove volatile material therefrom, (d) removing the particulate polymer from the purge vessel.

By "plug flow mode" is meant throughout this specification that the flow of particulate polymer through the relevant vessel occurs in such a manner that there is little or no axial mixing as the particulate polymer travels through the vessel, thus ensuring that the residence time of the particles is substantially uniform. "Plug flow" is sometimes referred to in the art as "mass flow", especially where the flow under consideration is movement of solid particulate materials.

Where the particulate polymer does not flow through the purge vessel in a substantially plug-flow-manner i.e. a batch process, "counter current" means counter gravitational.

Where the polymer moves through the purge vessel in substantially plug-flow mode. In the process of the present invention the flow characteristics of the particulate polymer in the purge vessel are such that the standard deviation of the residence time is preferably not greater than 50%, more preferably not greater than 20%, and even more preferably not greater than 10% of the mean residence time of the particulate polymer in the purge vessel.

In a preferred embodiment, the present invention provides a process for the separation of volatile material from particulate polymer which has been substantially freed from monomer in an earlier separation step, comprising (a) preheating the particulate polymer in a preheating vessel to a temperature greater than 30° C. but insufficiently high to cause the particles to become agglomerated, (b) feeding the particulate polymer to a purge vessel and causing it to move through the purge vessel in substantially plug-flow mode, (c) maintaining the particulate polymer in the purge vessel at a temperature greater than 30° C. but insufficiently high to cause the particles to become agglomerated, (d) feeding air to the purge vessel counter-current to the movement of the particulate polymer to remove volatile material therefrom, (e) removing the particulate polymer from the purge vessel.

The particulate polymer from which it is desired to remove volatile material can be, for example, polymer powder, pelletised polymer or granular material which has already been subjected to a primary monomer separation step. In the case that the particulate polymer has been prepared in the presence of a transition metal-containing catalyst, preferably any catalyst residues present in the polymer have been deactivated prior to treating the polymer in accordance with the process of the present invention. Preferably the particulate polymer is polyolefin powder, pellet or granular material having been prepared by polymerisation or (co)polymerisation of one or more monomeric 1-olefins, in the gas phase, the liquid phase (e.g. using so-called "particle form" polymerisation conditions), or the solution phase, or from the high temperature high pressure process (often referred to as the "high pressure process"). Alternatively, the particulate polyolefin can be polyolefin which has been converted into another particulate form, e.g. by granulation or pelletising. Preferably the particulate polyolefin is a pelleted polymer, more preferably a pelleted polyolefin.

The quantity of volatile material (excluding water) present in the polymer fed to the purge vessel is preferably not greater than 500 ppm (parts per million by weight), more preferably not greater than 60 ppm, and even more preferably not greater than 30 ppm.

The particulate polymer fed to the purge vessel can be preheated before entering the purge vessel, or can be heated in the purge vessel itself. It is preferred to preheat the particulate polymer using a preheating vessel located upstream of the purge vessel. The particulate polymer can be fed to the preheating vessel intermittently, continuously, as a batch or in batches. Preferably it is fed continuously. Preferably the particulate polymer moves through the preheating vessel in substantially plug-flow mode. The temperature to which the particulate polymer is heated in the preheating vessel is suitably at least 30° C., preferably at least 50° C., most preferably at least 70° C. or higher, provided that the temperature is insufficiently high to cause the particles to become agglomerated. As a rough guide, the temperature should not be greater than about 5° C. below the Vicat softening temperature. The particulate polymer is preferably fed to the heating vessel using a pneumatic conveying technique. If a preheating vessel is employed, it can, if desired, be provided with means to pass a purge gas countercurrent to the movement of the particulate polymer through the vessel. If desired, hot gas, e.g. hot nitrogen or hot air, can be used to heat the particulate polymer in the preheating vessel. Preferably the preheating vessel is heated using conventional industrial equipment, for example, steam or hot water jacketing.

The particulate polymer fed to the heating vessel (if one is employed) or to the purge vessel can contain residual water (eg surface moisture arising from cold water quenching of pellet produced directly from a pelleting machine), provided the quantity of heat provided and the rate of flow of gas through the vessel are sufficient to dry the particulate polymer well before it emerges from the purge vessel. Preferably the particulate polymer is substantially free from water before being fed to the purge vessel.

In the case that the particulate polymer is pelleted, the pellet can, if desired, be fed directly from the pelletising machine to the purge vessel, or to the heating vessel if one is employed. Feeding pellet to the purge vessel or to the heating vessel direct from the pelletising machine can make further savings in energy requirements, especially if the pellet discharge from said machine still contains residual heat from the pelletising process. This saving in energy can be optimised, for example, by suitable adjustment of the temperature of the quench water such that the pellet remains relatively hot after the quench, but not so hot that agglomeration of the pellets can occur.

The particulate polymer is fed to the purge vessel in any convenient manner, for example, using pneumatic conveying or by means of gravity feed devices employing suitable feeder valve means between the source and the purge vessel. It is preferred to feed the particulate polymer continuously to the purge vessel.

Where the particulate polymer flows through the purge vessel in a substantially plug-flow manner, the residence time of the particles in the vessel is substantially the same for all the particles. Plug flow can be achieved using conventional industrial equipment. Thus it is preferred to employ a purge vessel with smooth internal walls and having uniform cross section throughout a major portion of its length. A frustro-conical or other tapering cross section, for example, at the exit of the purge vessel, can be tolerated provided this does not impair the plug flow qualities of the vessel. The principles of plug flow are well known in the art and suitable apparatus can be readily designed adopting these principles. The purge vessel is preferably tubular and of substantially uniform cross section. The major portion may take the form, for example, of a tube having square or circular cross section. The purge vessel is most preferably a vertically disposed cylindrical vessel having a conical section at the base which tapers towards an outlet for the polymer located at the bottom of the vessel. Preferably the purge vessel is vertically disposed. Most preferably the purge vessel is of uniform cylindrical cross section throughout a major part of its length.

Where the particulate polymer flows through the purge vessel in a substantially plug-flow manner, the rate of flow and the dimensions of the purge vessel are suitably arranged so that the residence time of the particulate polymer in the purge vessel lies in the range from about 0.5 to 16 hours, preferably 2 to 16 hours, more preferably 6 to 10 hours.

The temperature to which the particulate polymer is heated in the purge vessel is suitably at least 30° C., preferably at least 50° C., most preferably at least 70° C. or higher, provided that the temperature is insufficiently high to cause the particles to become agglomerated. As mentioned above, as a rough guide, the temperature is preferably not greater than about 5° C. below the Vicat softening temperature. For example, if the Vicat softening temperature is 80° C., the maximum temperature to which the particulate polymer is heated should preferably not be greater than 75° C. In the case that the particulate polymer is high density polyethylene having a density of at least 0.945, the temperature of the heating in the purge vessel is preferably in the range 70 to 100° C. On the other hand, in the case that the particulate polymer is a lower density copolymer, for example, a copolymer of ethylene with a higher 1-olefin, e.g. having a density in the range 0.915 to 0.945, the said temperature preferably lies in the range 60 to 80° C. In any event the temperature must be insufficiently high to cause the particles to become agglomerated. Failure to observe this can result in the polymer becoming blocked in the preheating or purge vessels, or even forming an intractable mass within these vessels.

Where the particulate polymer flows through the purge vessel in a substantially plug-flow manner, it is moved through the purge vessel using any suitable means of motivation, for example using an Archimedean screw device or merely under the influence of gravity. Preferably the particulate polymer moves under the influence of gravity in response to the continuous removal of solid from the base of the purge vessel. Preferably the purge vessel is insulated to retain heat during purging.

Air is passed through the purge vessel counter current to the flow of the particulate polymer therein. Where the particulate polymer does not flow through the purge vessel in a substantially plug-flow manner i.e. a batch process, "counter current" means counter gravitational. If desired the air can be heated to maintain the temperature of the particulate polymer within the desired temperature range. If desired the air can be supplemented with another gas or gases, for example, nitrogen or carbon dioxide, e.g. if it is desired to reduce any potential risk of fire or explosion. However, the present invention is generally applied to the reduction of volatiles in particulate polymer in which the content of volatiles is already at a relatively low level. Accordingly, the level of volatiles present in the purge gas stream exiting from the purge vessel is normally not more than about 5 milligrams per litre of gas, preferably not more than about 1 milligram per litre of gas. The rate of flow of air (or air diluted with any other gas) through the particulate polymer is maintained at a level below that which would cause disruption of the plug flow of the particulate polymer. This is well below the rate of flow which would cause fluidisation of the particulate polymer. In the case of pelleted polymer, the rate of flow of gas that can be tolerated before the onset of disruption of the plug flow is generally substantially higher than for powdery polymer. Preferably the rate of flow of air is at least 0.5 litres per hour per square centimetre of cross section measured radially across the direction of flow of particulate polymer through the purge vessel (units hereinafter abbreviated to litershour$^{-1}$cm$^{-2}$). Thus for example, rates of flow of air from 2 to 10 litershour$_1$cm$^{-2}$ through the purge vessel are particularly useful. Substantially higher rates e.g. of 10 to 50 litershour$^1$cm$^{-2}$ can be employed if desired provided that, where the particulate polymer flows through the purge vessel in a substantially plug-flow manner, the plug flow mode of the particulate polymer does not become disrupted thereby.

The pressure in the purge vessel can be any desired pressure, but in practice the use of a pressure close to atmospheric pressure (e.g. slightly above 1 bar absolute) is generally satisfactory as this avoids the need to use expensive pressure vessels. In practice the introduction of the purge gas into the purge vessel will generally cause a slight increase of pressure therein.

Volatile materials diffuse from the particulate polymer in the purge vessel into the air stream and are carried counter current to the movement of the particulate polymer towards the region where the particulate polymer is fed to the vessel.

The air is preferably vented from the purge vessel using suitable piping means. The vented air containing the volatiles can be fed to a flare stack or, if it is desired to recover any volatile components, for example, it may be fed to a suitable recovery unit. Frequently it is found that the concentration of volatiles is so small that the air from the purge vessel can be vented direct to the atmosphere. Preferably the process conditions are maintained such that the concentration of any inflammable volatile materials in the air vented from the purge vessel provide less than 25%, preferably less than 5% of the flammability limit of the gas. The concentration of such volatile materials can be reduced, for example, by reducing one or more of the following: (1) the standing volume of particulate polymer in the purge vessel, (2) the rate of flow of the particulate polymer through the purge vessel and (3) the temperature of the particulate polymer in the purge vessel: or by increasing the rate of flow of the air through the purge vessel.

The particulate polymer is suitably removed from the purge vessel using conventional industrial conveying means for particulate materials. The particulate polymer is preferably removed from the purge vessel using withdrawal means to continuously withdraw said polymer therefrom, for example motorised valves or motorised screws. Preferably the withdrawal means are variable rate withdrawal means, for example, using variable speed motorised valves or motorised screws. The vessel is preferably equipped with means to detect the quantity or level of particulate polymer therein, for example a means to detect the level of settled particulate polymer in the vessel. Preferably the means to detect the quantity or level of particulate polymer within the vessel is coupled with the variable rate withdrawal means, for example, to maintain a constant volume of particulate polymer within the vessel. The coupling may be achieved, for example, by electronic means or mechanical means.

After the particulate polymer has passed through the purge vessel it is normally still hot and may require cooling before being transferred to storage or undergoing further treatment or processing. For example, in the case of polyethylene, if it is desired to transfer the particulate polymer to storage using dilute phase pneumatic conveying means, it is preferred to cool it to a temperature below about 65° C. before transfer to reduce the possibility of so called "angel hair" forming in the pneumatic conveying lines. The means used to cool the particulate polymer, if any, can comprise, for example, conventional industrial particulate cooling equipment. For example, the hot particulate polymer can be fed to a gas fluidised bed cooler operating under batch or continuous conditions.

In a further embodiment the present invention provides a process for the separation of volatile material from particulate polymer which has been substantially freed from monomer in an earlier separation step, comprising (a) feeding the particulate polymer to a purge vessel optionally causing it to move through the vessel in substantially plug-flow mode, (b) heating the particulate polymer in the purge vessel to a temperature greater than 30° C. but insufficiently high to cause the particles to become agglomerated, and/or maintaining the polymer at a temperature in this range in the purge vessel, (c) feeding air to the purge vessel counter-current to the movement of the particulate polymer to remove volatile material therefrom, (d) transferring the particulate polymer from the purge vessel to a cooling vessel wherein the particulate polymer moves through a cooling zone where it cools to the desired temperature and (e) removing the particulate polymer from the cooling vessel.

In this embodiment employing a cooling vessel to cool the particulate polymer emerging from the purge vessel, the particulate polymer fed to the purge vessel can be preheated if desired (as has been described above). Under these circumstances and where the particulate polymer flows through the purge vessel the rates of flow of the particulate polymer through each of the three vessels, i.e. the preheating vessel, the purge vessel and the cooling vessel, are preferably maintained the same in each vessel to provide a uniform and equal flow of particulate polymer through the three vessels.

As has been indicated above, it is preferred to withdraw particulate polymer from the purge vessel using means to withdraw the polymer continuously. Likewise, the preheating vessel and/or the cooling vessel are preferably equipped with means to withdraw the polymer continuously, for example using motorised valves or motorised screws. Preferably the withdrawal means are variable rate withdrawal means, for example, using variable speed motorised valves or motorised screws. The vessel(s) is/are preferably equipped with means to detect the quantity or level of particulate polymer therein, for example a means to detect the quantity or level of settled particulate polymer in the vessel(s). Preferably the means to detect the quantity or level of particulate polymer within the vessel(s) is coupled with the variable rate withdrawal means, for example, to maintain a constant volume of particulate polymer within the vessel (s). The coupling may be achieved, for example, by electronic means or mechanical means If desired, the flow of particulate polymer through the cooling vessel can be plug flow mode. Plug flow of the particulate polymer through the cooling vessel can be achieved by standard industrial means.

Particulate polymer suitably employed in the present invention can be, for example, polymer powders which are the direct products of polymerisation processes, provided that such polymer powders have been substantially freed from unreacted monomer in an earlier separation step, for example, the powder produced from gas fluidised bed polymerisation of olefins or from particle form processes for polymerising monomers in a liquid diluent. Preferred polymer particles are polymer pellets which are well known in the art as a standard product employed for the fabrication of polymeric articles. The size of the polymer particles is suitably in the range 0.1 to 10 mm, preferably in the range 2 to 7 mm. For example, polymer pellets employed in the fabrication of plastics articles generally lie in the range 3 to 6 mm.

Preferably the polymer particles comprise one or more polyolefins. Preferred polyolefins are polyethylene, polypropylene, and copolymers of ethylene with one or more $C_3$ to $C_{12}$ alpha olefins. Examples of such polymers are high density polyethylene, medium density polyethylene, linear low density polyethylene and very low density polyethylene (VLDPE).

The present invention will now be illustrated with reference to the accompanying drawings wherein FIG. 1 represents diagrammatically apparatus for reducing the volatiles content of linear high density polyethylene (hdPE) pellets prepared from hdPE powder prepared by the gas phase fluidised bed polymerisation of ethylene catalysed by a heat activated chromium oxide/silica based catalyst.

HDPE pellets were prepared using a conventional face-cutting pelleting machine by feeding HDPE pellet 94.75 weight %, and masterbatch 5.25 weight %, to the extruder, the masterbatch containing all the additive ingredients, i.e. antioxidants, process aids, and carbon black, and compounding into a homogeneous compound with pellet diameter approximately 4 mm. The produced pellets were dried using conventional drying equipment.

FIG. 1 shows a purge vessel 1, connected by inlet pipe 9 to the discharge pipe 14 of a preheating vessel 2 via motorised valve 12. The pelleted HDPE is fed by pneumatic conveying (not shown) along pipe 16 into the preheating vessel 2 wherein it forms a bed of pellet. The bed of pellet is preheated to 80° C. by a heating jacket (not shown) located around the outside 7 of vessel 2 and internal heating elements (not shown) located within the body of the vessel 2. The quantity of HDPE pellet in vessel 2 is calculated using detection means 8 for detecting the level 11 of pellet in vessel 2. The detection means is coupled to control and servo means (not shown) controlling motorised valve 12 which discharges the pellet from vessel 2 at a rate sufficient to maintain the level of pellet constant therein. The pellet discharges through inlet pipe 9 into purge vessel 1 wherein the temperature is maintained at 80° C. using heating means (not shown) located around the exterior surface 4 of vessel 1. The motorised valve 18 for discharging the pellet from vessel 1 is coupled to a servomechanism (not shown) and detection means 10 which detects the level 13 of pellet in vessel 1 so that the residence time of the pellet therein can be carefully controlled. In the present Example the residence time of the pellet in vessel 1 is controlled at eight hours ±15 minutes. The smooth interior walls of vessel 1 and the uniform cylindrical cross section facilitate plug flow of the pellet as it travels downwardly under the influence of gravity. Dried air is passed into vessel 1 through pipe 5 from where it passes upwardly through the bed of pellet in vessel 1. Volatile materials present in the bed of pellet diffuse into the air which exits from vessel 1 through pipe 6. The rate of air flow is adjusted by conventional means (not shown) to ensure that the level of hydrocarbon at pipe 6 is well below the lower explosion limit.

The pellet discharges continuously through pipe 20, motorised valve 18 and pipe 22 into the cooling vessel 3. Cooling vessel 3 is equipped with a cooling jacket (not shown). The residence time of the pellet in cooling vessel 3 is maintained at a time sufficiently long for the pellet to cool to 40° C. before being discharged through motorised valve 24. The rate of discharge through valve 24, and hence the residence time, is controlled by the level detection means 26 and a servomechanism (not shown). The pellet thus treated has reduced volatiles content and can be safely further processed or sent to silos for storage or shipping.

The invention claimed is:

1. A process for the separation of volatile material from particulate polymer particles which have been substantially freed from unreacted monomer in an earlier separation step, comprising (a) feeding the particulate polymer particles to a purge vessel, (b) heating the particulate polymer particles while they move through the purge vessel to a temperature greater than 30° C. but insufficiently high to cause the particles to become agglomerated, and/or maintaining the particulate polymer particles at a temperature in this range in the purge vessel, (c) feeding air to the purge vessel counter-current to the movement of the particulate polymer particles to remove volatile material therefrom, and (d) removing the particulate polymer particles from the purge vessel.

2. A process as claimed in claim 1 wherein the particulate polymer particles are preheated before entering the purge vessel.

3. A process as claimed in claim 1 wherein the polymer is a polyolefin.

4. A process as claimed in claim 3 wherein the polyolefin has been prepared in the gas-phase, the liquid phase, the solution phase or in a high pressure process.

5. A process as claimed in claim 4 wherein the polyolefin is polyethylene.

6. A process as claimed in claim 1 wherein the particulate polymer particles are heated to a temperature no greater than 5° C. below the Vicat softening temperature in the purge vessel and/or are maintained at a temperature in this range in the purge vessel.

7. A process as claimed in claim 1 wherein the quantity of volatile material (excluding water) present in the particulate polymer particles fed to the purge vessel is not greater than 500 ppm by weight.

8. A process as claimed in claim 1 wherein the level of volatiles present in a purge gas stream exiting the purge vessel is not more than about 5 milligrams per litre of gas.

9. A process as claimed in claim 1 wherein the particulate polymer particles are transferred from the purge vessel to a cooling vessel.

10. A process as claimed in claim 1 wherein the particulate polymer particles which are fed to the purge vessel are caused to move through the vessel in substantially plug flow mode.

11. A process as claimed in claim 10 wherein the flow characteristics of the particulate polymer particle in the purge vessel are such that a standard deviation of a residence time is not greater than 50% of a mean residence time of the particulate polymer particles in the purge vessel.

12. A process as claimed in claim 10 wherein the residence time of the particulate polymer particles in the purge vessel lies in the range of from 6 to 10 hours.

13. A process as claimed in claim 10 wherein the particulate polymer particles are moved through the purge vessel using an Archimedean screw device or under the influence of gravity.

14. A process as claimed in claim 13 wherein the particulate polymer particles move under the influence of gravity in response to a continuous removal of solid from a base of the purge vessel.

* * * * *